United States Patent
Shen et al.

(10) Patent No.: US 10,425,643 B2
(45) Date of Patent: Sep. 24, 2019

(54) METHOD AND SYSTEM FOR VIEW OPTIMIZATION OF A 360 DEGREES VIDEO

(71) Applicant: OrbViu Inc., San Mateo, CA (US)

(72) Inventors: Jiandong Shen, Cupertino, CA (US); Crusoe Xiaodong Mao, Hillsborough, CA (US); Brian Michael Christopher Watson, Groveland, CA (US); Frederick William Umminger, III, Oakland, CA (US)

(73) Assignee: OrbViu Inc., San Mateo, CA (US)

( * ) Notice: Subject to any disclaimer, the term of this patent is extended or adjusted under 35 U.S.C. 154(b) by 14 days.

(21) Appl. No.: 15/845,426

(22) Filed: Dec. 18, 2017

(65) Prior Publication Data

US 2018/0227579 A1     Aug. 9, 2018

Related U.S. Application Data

(60) Provisional application No. 62/454,743, filed on Feb. 4, 2017.

(51) Int. Cl.
| | |
|---|---|
| *H04N 19/124* | (2014.01) |
| *H04N 19/176* | (2014.01) |
| *H04N 19/167* | (2014.01) |
| *H04N 19/597* | (2014.01) |
| *H04N 19/625* | (2014.01) |

(52) U.S. Cl.
CPC ......... *H04N 19/124* (2014.11); *H04N 19/167* (2014.11); *H04N 19/176* (2014.11); *H04N 19/597* (2014.11); *H04N 19/625* (2014.11)

(58) Field of Classification Search
None
See application file for complete search history.

(56) References Cited

U.S. PATENT DOCUMENTS

| | | | |
|---|---|---|---|
| 9,098,737 B2 | 8/2015 | Sanaullah et al. | |
| 9,554,132 B2 | 1/2017 | Crenshaw et al. | |
| 9,743,078 B2* | 8/2017 | DeForest | H04N 19/51 |
| 10,140,508 B2* | 11/2018 | Zhang | G06K 9/66 |
| 10,185,877 B2* | 1/2019 | Pournaghi | G06K 9/00718 |
| 2004/0061787 A1* | 4/2004 | Liu | H04N 5/232 |
| | | | 348/218.1 |

(Continued)

*Primary Examiner* — Reza Aghevli
(74) *Attorney, Agent, or Firm* — Kanika Radhakrishnan; Evergreen Valley Law Group

(57) ABSTRACT

A method and system for view optimization of a 360 degrees video is provided. The method includes generating two-dimensional video frame from the 360 degrees video. The macroblocks are generated for the two-dimensional video frame. A foveated region of interest for the two-dimensional video frame is defined based on a given view orientation. DCT (Discrete Cosine Transform) coefficients are generated for the macroblocks. View adaptive DCT domain filtering is then performed on the DCT coefficients using the foveated region of interest. Quantization offset is calculated for the DCT coefficients using the foveated region of interest. The DCT coefficients are quantized using the quantization offset to generate encoded two-dimensional video frame for the view orientation. A new view orientation is then set as the given view orientation and steps of generating, performing, calculating, and quantizing are performed for each view orientation and each video frame to generate view optimized video.

19 Claims, 15 Drawing Sheets

(56) References Cited

U.S. PATENT DOCUMENTS

| | | | |
|---|---|---|---|
| 2006/0269103 A1* | 11/2006 | Brown | G06K 9/00778 |
| | | | 382/103 |
| 2009/0290791 A1* | 11/2009 | Holub | G06K 9/00234 |
| | | | 382/164 |
| 2012/0027079 A1* | 2/2012 | Ye | H04N 19/597 |
| | | | 375/240.02 |
| 2013/0271566 A1 | 10/2013 | Chen et al. | |
| 2014/0078250 A1 | 3/2014 | Zhang et al. | |
| 2014/0198838 A1* | 7/2014 | Andrysco | H04N 19/172 |
| | | | 375/240.1 |
| 2016/0275357 A1* | 9/2016 | Gino | G06K 9/6206 |
| 2017/0054982 A1* | 2/2017 | Vellore Arumugam | |
| | | | H04N 19/132 |
| 2017/0178687 A1* | 6/2017 | Tamir | H04N 5/0733 |
| 2017/0256065 A1* | 9/2017 | Wu | G06T 7/215 |
| 2017/0294049 A1 | 10/2017 | Zhou | |
| 2017/0339417 A1* | 11/2017 | Puri | H04N 19/167 |
| 2018/0096494 A1 | 4/2018 | Zhou | |
| 2018/0213225 A1* | 7/2018 | Shen | H04N 21/234381 |
| 2018/0218484 A1* | 8/2018 | Shen | G06T 3/4007 |

\* cited by examiner

900

1000

METHOD AND SYSTEM FOR VIEW OPTIMIZATION OF A 360 DEGREES VIDEO

FIELD OF THE INVENTION

The present disclosure relates to a method and a system for view optimization of a 360 degrees video and, more particularly, to a method and system for view optimization of a 360 degrees video during encoding for consumption by a virtual reality (VR) device.

BACKGROUND

In a typical video processing scenario, a video is first encoded to reduce consumption of bandwidth during transfer of the video. The encoded video is then streamed to a client. With use of 360 degrees video, the storage and transfer of the 360 degrees video poses a much bigger challenge than that of traditional video. Also, at any given point of time, the 360 degrees video to be displayed is limited by field of view of human and hence, not entire 360 degrees video can be viewed at the given point of time. This indicates redundancy in huge amount of information carried in 360 degrees video. Hence, there is a need for optimizing 360 degrees video.

In general, view optimization method includes preserving quality of the 360 degrees video for content inside the field of view, and reducing the quality for content outside the field of view. One existing technique for performing view optimization includes mapping a spherical video frame onto the surfaces of a cube. The front view of the cube is preserved while the four side views and the one back side view are suppressed with various amounts depending on the mapping method, such as a pyramidal mapping method. However, such a view optimization suffers from several drawbacks such as large redundancy in storing the view point array as each view point is independent. The view point here refers to a specific view orientation of the spherical video frame. In addition, since all view point arrays are independent there is longer latency when switching views while playing the 360 degrees video. Therefore, there remains an unmet need for performing view optimization of 360 degrees video efficiently.

SUMMARY

Various embodiments of the present disclosure provide systems and methods for view optimization of a 360 degrees video.

A method for view optimization of a video by a server is provided. The method includes receiving a video frame as an input video. The method also includes defining a foveated region of interest for a given view orientation of the video frame. Further, the method includes applying foveated region of interest to the video frame. The method also includes encoding the video frame on which foveated region of interest is applied to generate optimized view orientation for the video frame.

A system for view optimization of a video is provided. The system includes a region of interest generator for generating a foveated region of interest for the video. The system also includes an encoder for encoding the video and generating optimized video using the foveated region of interest. The encoder includes a DCT (Discrete Cosine Transform) coefficient generator for generating DCT coefficients for a video frame of the video. The encoder also includes a view adaptive DCT domain filter for performing view adaptive DCT domain filtering on the video frame based on the foveated region of interest. Further, the encoder includes a view adaptive quantization offset calculator for calculating the view adaptive quantization offset based on the foveated region of interest. The encoder also includes a normal quantizer for quantizing the video frame using the view adaptive quantization offset to generate the optimized video.

A system includes a processor. The system also includes a memory coupled to the processor. The memory stores instructions which when executed by the processor cause the system to perform a method for view optimization of a 360 degrees video. The method includes generating two-dimensional video frame from the 360 degrees video. The macroblocks are generated for the two-dimensional video frame. A foveated region of interest for the two-dimensional video frame is defined based on a given view orientation. DCT (Discrete Cosine Transform) coefficients are generated for the macroblocks. View adaptive DCT domain filtering is then performed on the DCT coefficients using the foveated region of interest. Quantization offset is calculated for the DCT coefficients using the foveated region of interest. The DCT coefficients are quantized using the quantization offset to generate encoded two-dimensional video frame for the view orientation. A new view orientation is then set as the given view orientation and steps of generating, performing, calculating, and quantizing are performed for each view orientation and each video frame to generate view optimized video.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
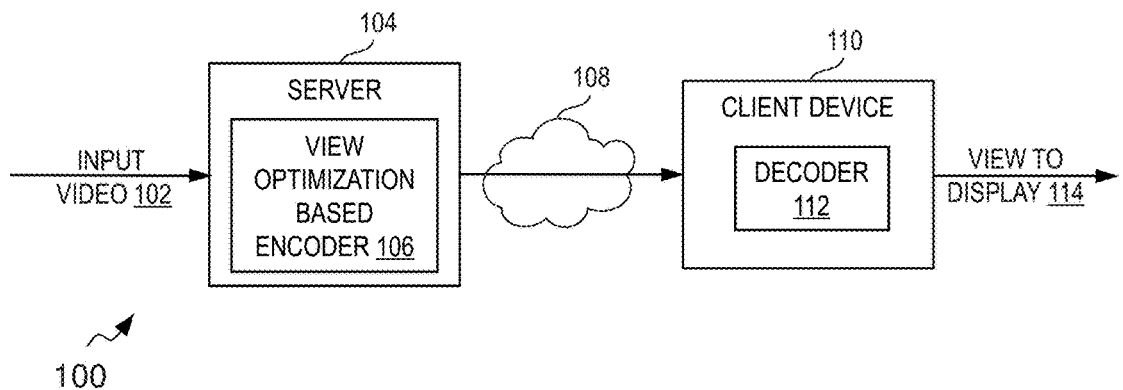
FIG. 1 illustrates an environment, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

A method and a system for performing view optimization of 360 degrees video for consumption by a virtual reality (VR) device are provided.

The input video is received by a server and encoded. The input video has a plurality of video frames. Each video frame is partitioned into a plurality of macroblocks. During encoding, the input video is processed frame by frame. For 360 degrees video, the 2D video frames are generated through 3D to 2D mapping of the physical spherical video signal. Each such a 2D video frame has full 360 degrees view coverage. A 360 degrees video can be viewed from an arbitrary view orientation that user selects. The change of view orientation is usually achieved through a sphere rotation transform to the 2D video frame.

A foveated region of interest (ROI) is a region of interest (ROI) defined on a 2D video frame. The size and shape of a foveated ROI is defined per the shape of human eye's resolution change and the size of the field of view (FOV). In general, on a 2D video frame, the closer a location is to a view center of the foveated ROI, the higher is its interest value, and vice versa. For a location within the foveated ROI, the ROI interest value is defined to be positive. For a location outside the foveated ROI, the ROI interest value is defined to be negative. At the boundary of the foveated ROI, the ROI interest value is defined to be zero. In general, the foveated ROI can be defined to the accuracy of pixels. In some embodiments, the foveated ROI of the video frame is defined on macroblock basis to better fit video encoding structure. The shape of the foveated ROI is defined to match human vision characteristics and the field of view of the client device (also referred to as viewing device). It is controlled through a shape function. In one embodiment, the shape function is a simple triangle in which X-axis is the normalized sphere distance (0.0 to 1.0), Y-axis is the ROI interest value (−1.5 to +0.5) and X=0.25 corresponds to 90 degree FOV. In some embodiments, the foveated ROI only needs to be calculated once and is applied to all the frames in the video.

One foveated ROI can be defined for a given view center. By changing the view center on a 2D video frame, we can shift the foveated ROI on the 2D video frame. This is equivalent to rotating the foveated ROI on a sphere from one view orientation to another. Unlike existing solutions in which spherical rotation is performed on video frame and the rotated frame is then processed as new frame for each view orientation, we can achieve the view orientation change through the rotation of the foveated ROI. Comparing to a 3D spherical rotation operation, the rotation of foveated ROI is a lot simpler. It is also fully operated in 2D video frame, allowing us to handle the entire view optimization process in 2D video frame.

A foveated ROI is calculated using the distance from a location on 2D video frame to the view center. For a 360 degree video, a measure of the Euclidean distance between two points on a 2D video frame is not an accurate measure of the distance between the two corresponding points on the sphere. A spherical distance that is calculated directly on the sphere or its approximated cube surface is used. In general, a spherical distance can be calculated for each pixel on a 2D video frame. In some embodiments, an average spherical distance for each macroblock is calculated instead to better fit the video encoding structure. For example, in one embodiment, a sub-set of pixels (2×2 or 4×4) of the macroblock is selected. The point to point spherical distance for every pixel in the sub-set is then calculated. The average of the spherical distance of all the pixels in the sub-set is then calculated and used as the spherical distance for the macroblock. The spherical distances are calculated for all macroblocks to determine its location within the foveated ROI.

The defined foveated ROI is applied to control the encoding of the video frames to achieve view optimized compression. For a given view orientation that is to be optimized, the foveated ROI is first defined. This is done by calculating the foveated ROI value for each macroblock on the 2D video frame according to the spherical distance and the control shape function. During the encoding process, discrete cosine transform (DCT) coefficients are generated for each macroblock. A view adaptive DCT low pass filtering is then performed for the DCT coefficients of the macroblocks. The strength of the filtering is based on foveated ROI value. In general, the closer the macroblock is to the view center, the weaker the filtering strength and the farther away the macroblock is to the view center, the stronger the filtering strength. A view adaptive quantization is then performed for the DCT coefficients of the macroblocks. The foveated ROI value of a macroblock is used to calculate a quantization offset value for each macroblock. In general, the closer the macroblock is to the view center, the more negative offset value is assigned and the farther away the macroblock is to the view center, the more positive offset value is assigned. The quantization strength is then adjusted based on the adaptive offset values. A negative offset value helps reduce the quantization strength while a positive offset value helps increase the quantization strength. A normal quantization of the DCT coefficients is then performed to generate encoded video. The video is now optimized for the given view orientation. If any other view orientation also needs to be optimized, then the above process is repeated. The process continues till all view orientations of the video frame are optimized. Similarly, other video frames are processed.

The encoded and view optimized video is then streamed to the client device for decoding and viewing.

FIG. 1 illustrates an environment 100, in accordance with an example embodiment of the present disclosure.

The environment 100 includes a server 104 that receives an input video 102, hereinafter referred to as the video 102. The video 102 includes multiple video frames. The server 104 includes a view optimization based encoder 106 for processing the video frames to generate view optimized and encoded video. The view optimized and encoded video is then streamed to a client device 110 via a network 108. The view optimized and encoded video is then decoded by a decoder 112 to generate a view to display 114.

The decoder 112 uses any known suitable decoding technique to decode the optimized and encoded video.

Figure 2:
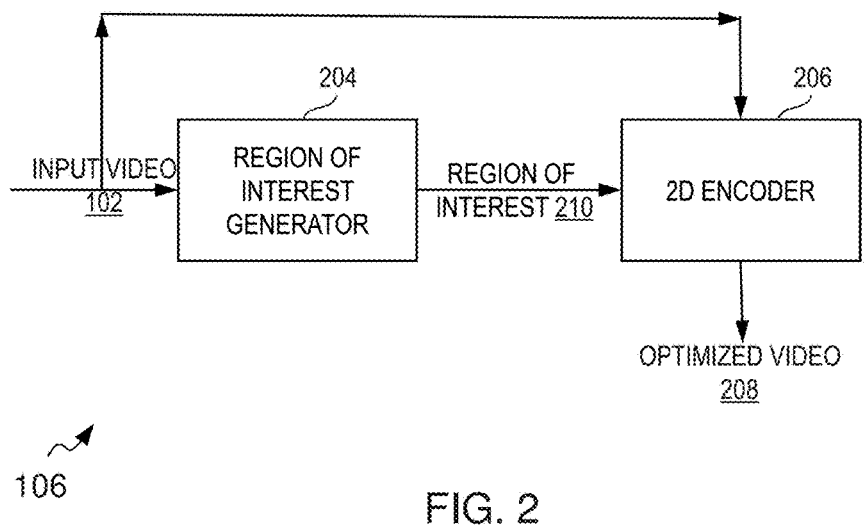
FIG. 2 illustrates a view optimization based encoder, in accordance with an example embodiment of the present disclosure.

FIG. 2 illustrates the view optimization based encoder 106, in accordance with an example embodiment of the present disclosure. The view optimization based encoder 106 receives the video 102 and generates a plurality of macroblocks for one or more video frames. The view optimization based encoder 106 includes a macroblocks generator (not shows in FIG. 2) for generating the macroblocks. One video frame has two or more macroblocks. The macroblocks are processed by a region of interest generator 204 to generate a foveated region of interest (ROI) 210, hereinafter referred to as the ROI 210. The ROI 210 is defined on macroblock basis to better fit video encoding structure. The shape of the ROI 210 is defined to match human vision characteristics and the field of view (FOV) of the client device 110. In some embodiments, the spherical distances between macroblocks and view center of the ROI 210 are generated. In some embodiments, the ROI 210 only needs to be calculated once and is applied to all the frames in the video 102. The generation of ROI 210 is explained in detail in conjunction with FIGS. 4 to 11.

The video frame from the video 102 is then processed through a 2D encoder 206 using the ROI 210 to generate view optimized encoded video frame. Multiple orientations of the video frame are processed through the 2D encoder 206. The orientations have the ROI 210 with shape of the ROI 210 determined using human vision characteristics and the FOV as described in detail in FIGS. 9 to 11. Unlike existing solutions in which spherical rotation is performed on video frame and the rotated frame is then processed as new frame for each view orientation, the foveated ROI is rotated instead of the video frame and the video frame remains unchanged.

Various orientations of various video frames are processed through the 2D encoder using the ROI 210 to generate optimized and encoded video (see, optimized video 208) which is then streamed over the network 108. It is to be appreciated that the encoding can be performed orientation by orientation or video frame by video frame or for entire video together once optimization is done.

Figure 3:
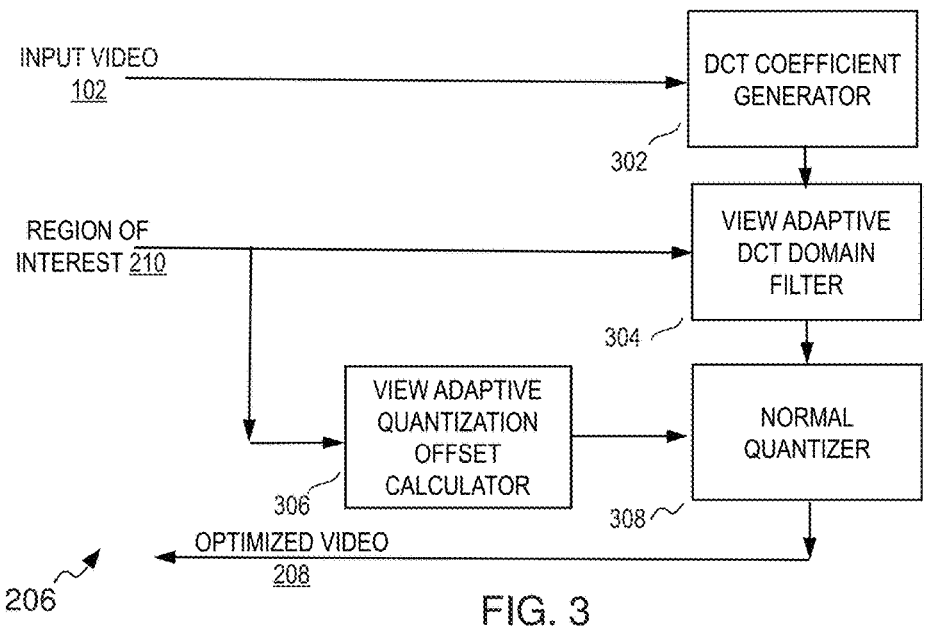
FIG. 3 illustrates a 2D encoder, in accordance with an example embodiment of the present disclosure.

FIG. 3 illustrates the 2D encoder 206, in accordance with an example embodiment of the present disclosure. The macroblocks from input video 102 are processed using a DCT coefficient generator 302 to generate DCT coefficients for the macroblocks. The generated DCT coefficients are fed into a view adaptive DCT domain filter 304 for processing. The ROI 210 is also fed into the view adaptive DCT domain filter 304 to do filtering strength control. The filtered DCT coefficients are then fed into a normal quantizer 308 for further processing. The ROI 210 is fed into a view adaptive quantization offset calculator 306 to calculate quantization offset. The calculated quantization offset is fed into a normal quantizer 308 to adjust the quantization strength for each macroblock. The normal quantizer 308 does the quantization using the adjusted quantization strength to the DCT coefficients to generate the encoded video stream.

Quantization is a common technology used in image and video compression. A simple quantization process includes, at encoder side, partitioning of a video frame into macroblocks. A single quantization step value is then assigned to each macroblock. The quantization step is applied to the Discrete Cosine Transform (DCT) coefficients of the image or video frame. The DCT coefficients are discretized by the quantization step to smaller integer index values that are easier for compression. The discretization process is called quantization. Adaptive quantization is a common technology used in image and video compression in which each macroblock can have a different quantization step. Encoder selects the quantization step for each macroblock to achieve an optimal balance between compression efficiency and video quality. Traditional adaptive quantization technology adjusts quantization step based on video content such as texture, motion etc. There is no view orientation related adaptation as in present disclosure. In one embodiment, the view adaptive quantization offset calculator 306 calculates quantization offset not only based on video content but also based on its location in foveated ROI of the view. When a macroblock is located inside the FOV of the view, the view adaptive quantization offset calculator 306 produces a negative quantization offset to help adjust the quantization strength lower to improve the video quality. When a macroblock is located outside the FOV of the view, the view adaptive quantization offset calculator 306 produces a positive offset to help increase the quantization strength to reduce the bitrate.

The view adaptive quantization offset calculator 306 performs processing in following manner:
If the macroblock has positive ROI value, i.e., the macroblock is inside FOV
Assign negative value to "quant_offset"
The higher the ROI value is, i.e., the closer the macroblock is to the view center,
The larger negative value is assigned to "quant_offset"
"quant" is to be lower than "quant_0"
If the macroblock has negative ROI value, i.e., the macroblock is outside FOV
Assign positive value to "quant_offset"
The higher the absolute ROI value is, i.e., the far away the macroblock is to the view center,
The larger positive value is assigned to "quant_offset"
"quant" is to be higher than "quant_0"

DCT domain filtering typically includes following. H.264 encoder converts the pixels of a macroblock into DCT domain coefficients. The transform is done on 8×8 or 4×4 block size. The low frequency DCT coefficients correspond to flat area. The high frequency DCT coefficients correspond to details. One way to apply DCT domain filtering is to apply a threshold on DCT coefficients. The low frequency coefficients are usually larger and are kept. The high frequency coefficients are usually smaller and are removed. Due to the lack of high frequency coefficients, the reconstructed video will look softer. Adaptive DCT domain filtering is a common technology used in image and video compression. The strength of DCT domain filter is defined by its threshold. The larger the threshold value, the stronger the filtering strength. In traditional adaptive filtering technology, adjustment of filtering strength is based on video content such as texture, motion etc. However, the view adaptive DCT domain filter 304 adjusts filtering strength based on the macroblock location in the foveated ROI of the view. When a macroblock is located inside the FOV of the view, the view adaptive DCT domain filter 304 reduces the filtering strength to improve the video quality. When a macroblock is located outside the FOV of the view, the view adaptive DCT domain filter 304 increases the filtering strength to achieve more information reduction.

The view adaptive DC domain filter 304 performs the processing in following manner:
For a given macroblock, a filtering threshold is defined as a function of the macroblock's foveated ROI value
If the macroblock has positive ROI value, i.e., the macroblock is inside FOV
Assign small value to the threshold
The higher the ROI value is, i.e., the closer the macroblock is to the view center, the smaller the threshold value is
At the view center, threshold should be zero
If the macroblock has negative ROI value, i.e., the macroblock is outside FOV
Assign larger value to the threshold
The higher the absolute ROI value is, i.e., the far away the macroblock is to the view center, the larger the threshold value is The normal quantization is also performed by the normal quantizer 308 to generate view optimized encoded video 208. The processing is done for all macroblocks of the view orientation of the video frame. All view orientations are covered and then all video frames are processed to generate optimized video frames. Finally, either view orientation by view orientation, or video frame by video frame, or all together the encoding is performed to generate optimized and encoded video for streaming.

Figure 4:
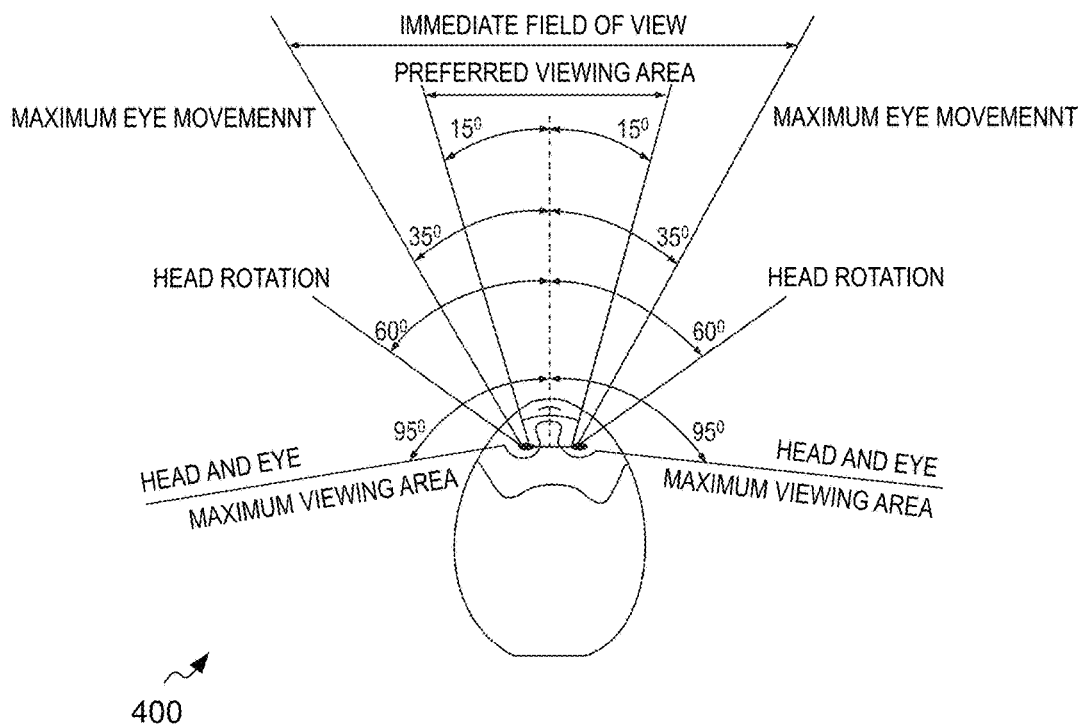
FIG. 4 illustrates a field of view, in accordance with an example embodiment of the present disclosure.

The normal quantizer 308 performs processing in following manner:
For a given macroblock:
Assume "quant_0" is the base quantization step from traditional method
"quant_offset" is the amount of adjustment to be made based on the view
The final quantization step of the macroblock is quant=quant_0+quant_offset FIG. 4 illustrates a field of view (FOV) 400, in accordance with an example embodiment of the present disclosure. In one embodiment, the FOV is the extent of the observable world that is seen at any given moment. The FOV is defined in the number of degrees of the view angle. Human eyes have limited FOV. For example, when head is not moving, the maximum FOV is ~120 degrees. When looking through the client device 110, the FOV is often limited by the optical characteristics of the client device 110. For example, in one embodiment the FOV is ~90 degrees. In another embodiment, the FOV can take any range based on the client device 110. The FOV has a preferred viewing area which is a comfort area and an immediate field of view limited by maximum eye movement. The maximum viewing area is defined by considering rotation of both head and eyes.

Figure 5:
FIG. 5 illustrates a foveated region, in accordance with an example embodiment of the present disclosure.

FIG. 5 illustrates a foveated region 502, in accordance with an example embodiment of the present disclosure. Human eyes have the highest resolution at the view center. The eye's resolution decreases as the distance to the view center increases. The view center of the human eye corresponds to the center of the eye's retina. The center of the eye's retina is known as fovea and the area corresponding to that is called the foveated region 502. The foveated region 502 has a view center as center of the foveated region 502.

Figure 6:
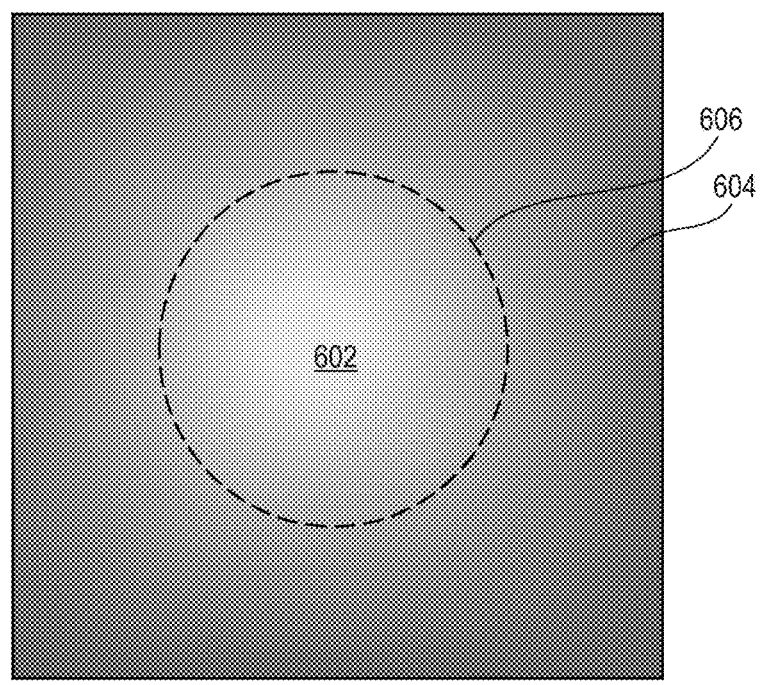
FIG. 6 illustrates a foveated region of interest, in accordance with an example embodiment of the present disclosure.

FIG. 6 illustrates a foveated region of interest, in accordance with an example embodiment of the present disclosure. The fovea is used to define the foveated ROI on video frame according to the shape of human eye's resolution change and the size of the field of view (FOV). In general, the closer a location is to a view center of the foveated ROI, the higher is its interest value, and vice versa. For a location within the FOV, the ROI interest value is positive such as that shown in area 602. For a location outside the FOV, the ROI interest value is negative such as that shown in area 604. At the boundary of the FOV, the ROI interest value is zero such as that shown in area 606.

Applying the foveated ROI, i.e. the ROI 210, for view optimization has many benefits including storage reduction, bandwidth reduction, and efficient streaming. In general, a foveated ROI view optimization works as followings. When a location has positive interest value, more bitrates are allocated to preserve the video quality. The higher the interest value is the more preservation is to be made. When a location has negative interest value; less bitrates are allocated to improve compression efficiency at the cost of reduced video quality. The higher the absolute interest value is the more reduction is to be made.

In some embodiments, the foveated ROI is defined on a 2D video frame. For defining the foveated ROI, the spherical video is mapped to a 2D frame. The mapping results in distance distortion and hence, various calculations are done to determine spherical distances between any two points in 2D frame and hence, between various macroblocks and the view center. The foveated ROI is based on the distance of a location to the view center. For spherical video, the mapping from 3D form to 2D form introduces geometry distortions. A measure of the Euclidean distance between two points on a 2D frame is not an accurate measure of the distance between the two corresponding points on the sphere. A proper measure of the spherical distance is required as illustrated in FIGS. 7 to 8.

Figure 7:
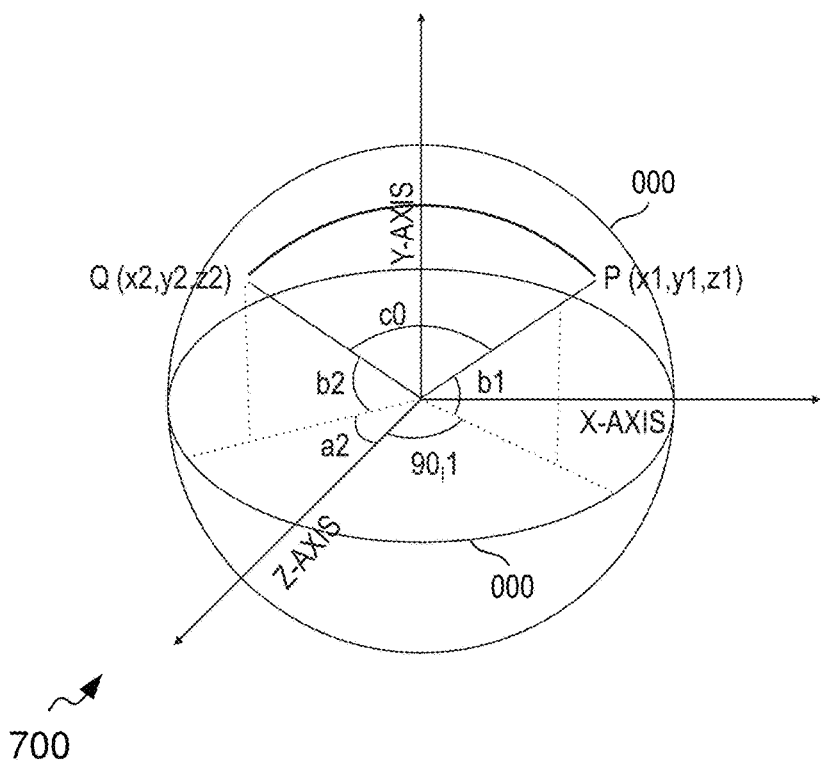
FIG. 7 illustrates calculations of spherical distance for equirectangular mapping of sphere, in accordance with an example embodiment of the present disclosure.

FIG. 7 is a schematic representation 700 for calculations of spherical distance for equirectangular mapping of sphere, in accordance with an example embodiment of the present disclosure. Equirectangular is the most commonly used sphere to 2D frame mapping method. Each point (x, y) on equirectangular mapped 2D frame corresponds to a unique point (yaw, pitch) on a unit sphere. The spherical distance between two points (x1, y1) and (x2, y2) on equirectangular frame is defined as the spherical distance between two points (yaw1, pitch1) and (yaw2, pitch2) on unit sphere. The distance of two points P and Q on the sphere can be calculated using standard mathematical method as d=cosine inverse of dot product of P and Q.

Figure 8:
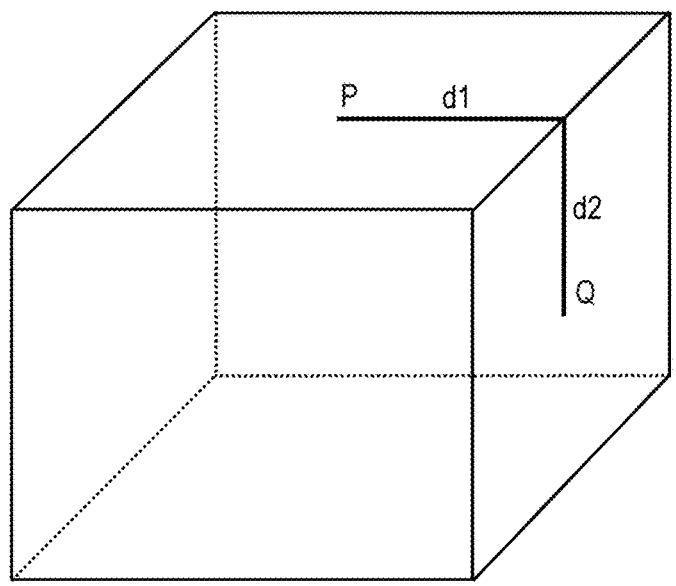
FIG. 8 illustrates calculations of spherical distance for cube mapping of sphere, in accordance with an example embodiment of the present disclosure.

FIG. 8 is a schematic representation 800 for calculations of spherical distance for cube mapping of sphere, in accordance with an example embodiment of the present disclosure. Cube is another commonly used sphere to 2D frame mapping method. Spherical distance can be approximated by the cube surface distance. The cube surface distance of two points P and Q can be calculated as the sum of two Euclidean distances d1 and d2, such as d=d1+d2.

The spherical distances between two points are then used to determine spherical distances for macroblocks as the processing is done based on macroblocks, in some embodiments. The foveated ROI is macroblock based. Each macroblock is 16×16 pixels which match that used in H.264 codec. One foveated ROI value is defined for every macroblock as this is convenient for video encoding quality adjustment. To calculate the spherical distance of a macroblock following process is done:

Select a sub-set of pixels (2×2 or 4×4) of the macroblock

Calculate the point to point spherical distance for every pixels in the sub-set

Calculate the average of the spherical distance of all the pixels in the sub-set Use the average as the spherical distance for the macroblock In another embodiment, instead of macroblocks the processing can be based on pixels.

Figure 9:
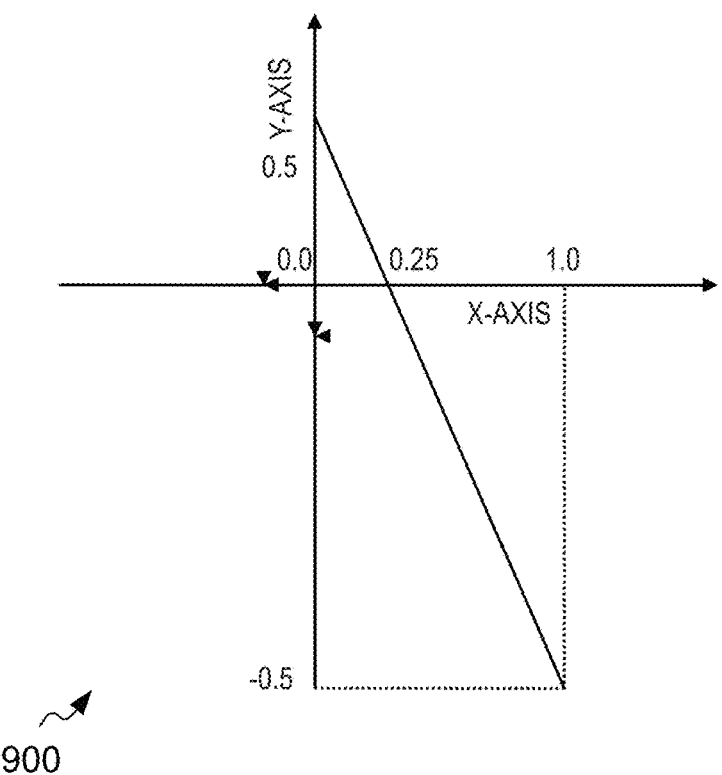
FIG. 9 illustrates controlling of shape of foveated region of interest, in accordance with an example embodiment of the present disclosure.

FIG. 9 is a schematic representation 900 for controlling of shape of foveated ROI, in accordance with an example embodiment of the present disclosure. The shape of the foveated ROI is controlled through a shape function. In some embodiments, the shape function can be sophisticated to match the human vision characteristics. An example of the shape function includes a simple triangle. X-axis is the normalized sphere distance (0.0 to 1.0). Y-axis is the ROI interest value (−1.5 to +0.5). X=0.25 corresponds to 90 degree FOV.

Figure 11:
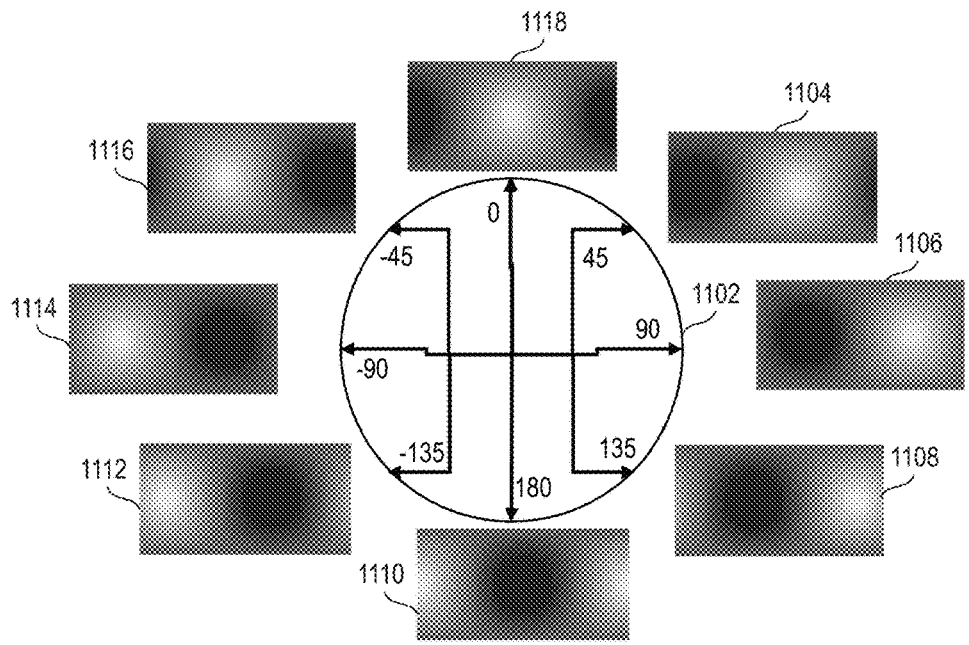
FIG. 11 illustrates a rotation of the foveated region of interest generated from equirectangular mapping, in accordance with an example embodiment of the present disclosure.

Unlike existing solutions in which spherical rotation is performed on video frame and the rotated frame is then processed as new frame for each view orientation, the foveated ROI is rotated instead of the video frame and the video frame remains unchanged. This helps in simplifying the calculation and allows the entire view optimization process to be handled in 2D video frame. In various embodiments, the video frame is unchanged but the center of the ROI is changed to be the desired view center. The foveated ROI is based on the foveated ROI center. The foveated ROI is rotated instead of the video frame as shown in FIG. 11. This results in much simple processing.

Figure 10:
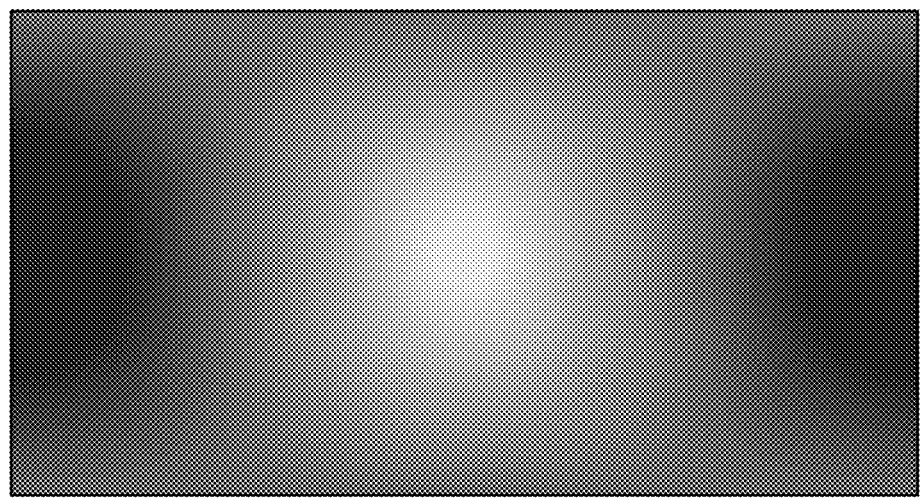
FIG. 10 illustrates a foveated region of interest generated from equirectangular mapping, in accordance with an example embodiment of the present disclosure.

FIG. 10 is a schematic representation 1000 illustrating a foveated region of interest generated from equirectangular mapping, in accordance with an example embodiment of the present disclosure. The foveated ROI corresponds to front view where both yaw and pitch is zero degree.

FIG. 11 illustrates a rotation of the foveated region of interest generated from equirectangular mapping, in accordance with an example embodiment of the present disclosure. The foveated ROI is rotated instead of rotation of entire frame. The foveated ROIs 1104 to 1118 shows rotation (see, 1102) of the foveated ROI when yaw changes from −135 degrees to 180 degrees and pitch remains as zero degree.

Figure 12:
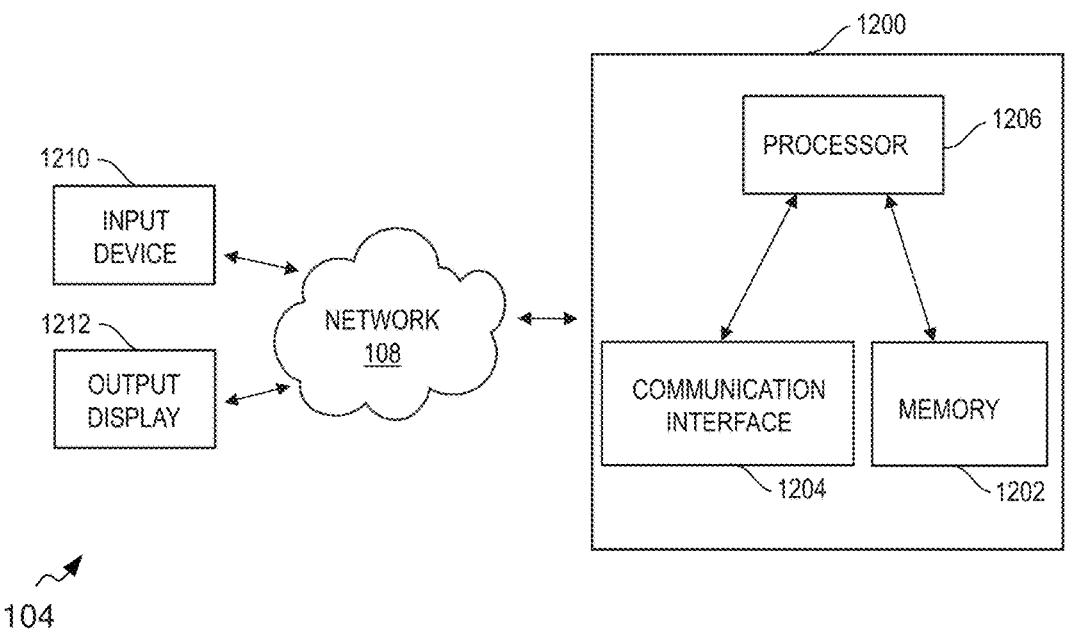
FIG. 12 illustrates a server, in accordance with an example embodiment of the present disclosure.

FIG. 12 illustrates a block diagram that represents the server 104, in accordance with an example embodiment of the present disclosure. In an embodiment, the server 104 includes a memory 1202, a communication interface 1204 and at least one processor 1206 for performing image processing including receiving, encoding/decoding, image-video-audio processing, and streaming of input video.

The memory 1202 is a storage device embodied as one or more volatile memory devices, one or more non-volatile memory devices, and/or a combination of one or more volatile memory devices and non-volatile memory devices, for storing micro-contents information and instructions. The memory 1202 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The communication interface 1204 may enable the server 104 to communicate with one or more client devices (e.g., client device 110 as shown in FIG. 1) through the network 108.

In an embodiment, the server 104 is also shown to take an input from an input device 1210, which is directly coupled to the server 104 or via the network 108 for receiving input video (e.g., the video 102 as shown in FIG. 1). The server 104 further shows an output display 1212, such as but not limited to a cathode ray tube (CRT), a LCD screen, a mobile device screen and a laptop screen for displaying information to the user. The communication interface 1204 is capable of communicating with the network 108, example of which may include but are not limited to, wired, wireless cell phone networks, Wi-Fi networks, terrestrial microwave network, or any form of Internet. While only one input device 1210 and one output display 1212 is depicted in FIG. 12 for illustrative purposes, and it would be apparent that any number of input devices and output devices can be coupled with the server 104 through the network 108.

The processor 1206 is communicably coupled with the memory 1202 and the communication interface 1204. The processor 1206 is capable of executing the stored machine executable instructions in the memory 1202 or within the processor 1206 or any storage location accessible to the processor 1206. The processor 1206 may be embodied in a number of different ways. In an embodiment, the processor 1206 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 1106 performs various functionalities of the server 104 as described herein.

Figure 13:
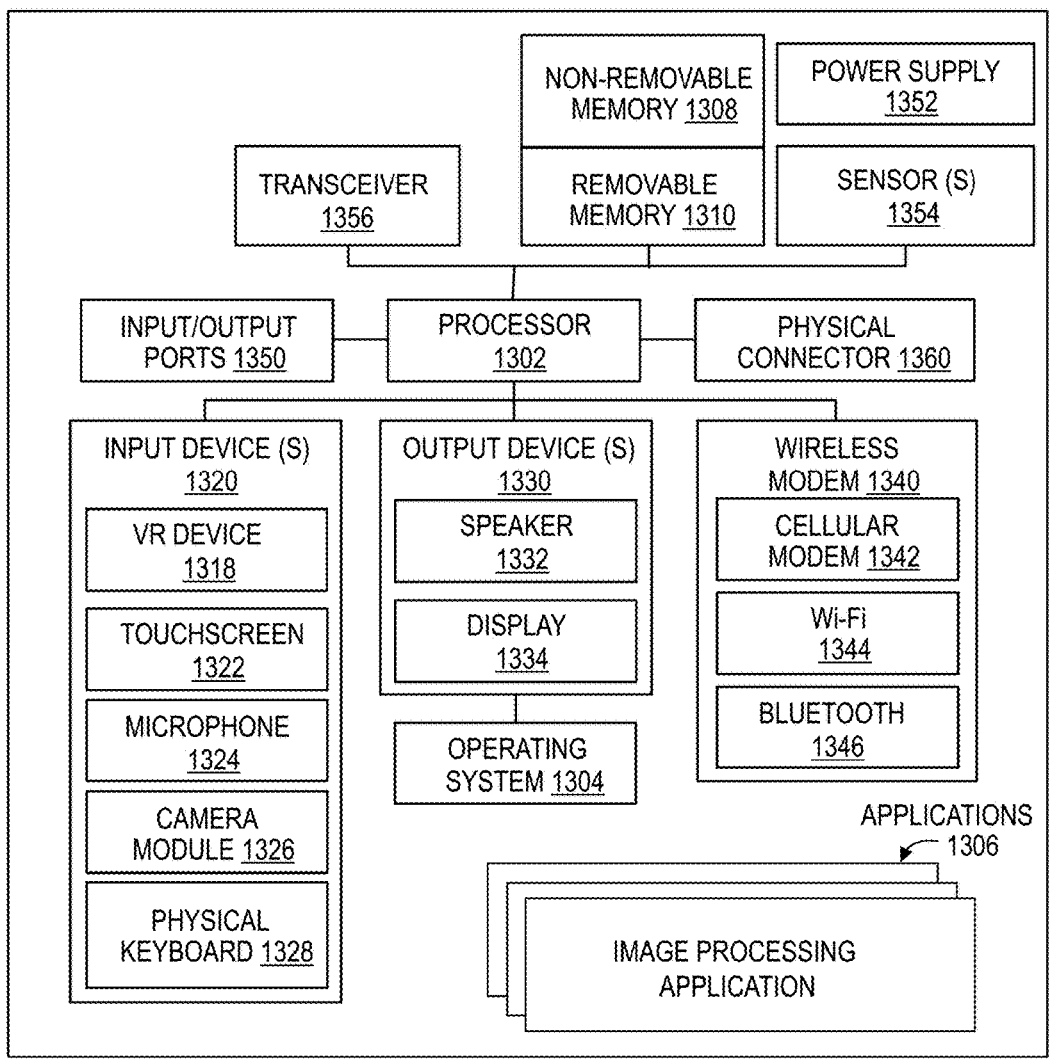
FIG. 13 illustrates a client device, in accordance with an example embodiment of the present disclosure.

FIG. 13 illustrates a block diagram 1300 that represents the client device 110, in accordance with an example embodiment of the present disclosure.

It should be understood that the client device 110 as illustrated and hereinafter described is merely illustrative of one type of device and should not be taken to limit the scope of the embodiments. As such, it should be appreciated that at least some of the components described below in connection with the client device 110 may be optional and thus in an example embodiment may include more, less or different components than those described in connection with the example embodiment of the FIG. 13. As such, among other examples, the client device 110 could be any of a mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated client device 110 includes a controller or a processor 1302 (e.g., a signal processor, microprocessor, ASIC, or other control and processing logic circuitry) for performing such tasks as signal coding, data processing, image processing, input/output processing, power control, and/or other functions. An operating system 1304 controls the allocation and usage of the components of the client device 110 and support for one or more applications programs (see applications 1306), such as a VR application, that implements one or more of the innovative features described herein.

The illustrated client device 110 includes one or more memory components, for example, a non-removable memory 1308 and/or removable memory 1310. The non-removable memory 1308 can include RAM, ROM, flash memory, a hard disk, or other well-known memory storage technologies. The removable memory 1310 can include flash memory, smart cards, or a Subscriber Identity Module (SIM). The one or more memory components can be used for storing data and/or code for running the operating system 1304 and the applications 1306. Example of data can include web pages, text, images, sound files, image data, video data, or other data sets to be sent to and/or received from one or more network servers or other devices via one or more wired or wireless networks.

The client device 110 can support one or more input devices 1320 and one or more output devices 1330. Examples of the input devices 1320 may include, but are not limited to, a VR device 1318 for providing head movement, a touchscreen 1322 (e.g., capable of capturing finger tap inputs, finger gesture inputs, multi-finger tap inputs, multi-finger gesture inputs, or keystroke inputs from a virtual keyboard or keypad), a microphone 1324 (e.g., capable of capturing voice input), a camera module 1326 (e.g., capable of capturing still picture images and/or video images) and a physical keyboard 1328. Examples of the output devices 1330 may include, but are not limited to a speaker 1332 and a display 1334. Other possible output devices (not shown in the FIG. 13) can include piezoelectric or other haptic output devices. Some devices can serve more than one input/output function. For example, the touchscreen 1322 and the display 1334 can be combined into a single input/output device.

A wireless modem 1340 can be coupled to one or more antennas (not shown in the FIG. 13) and can support two-way communications between the processor 1302 and external devices, as is well understood in the art. The wireless modem 1340 is shown generically and can include, for example, a cellular modem 1342 for communicating at long range with the mobile communication network, a Wi-Fi compatible modem 1344 for communicating at short range with an external Bluetooth-equipped device or a local wireless data network or router, and/or a Bluetooth-compatible modem 1346. The wireless modem 1340 is typically configured for communication with one or more cellular networks, such as a GSM network for data and voice communications within a single cellular network, between cellular networks, or between the client device 110 and a public switched telephone network (PSTN).

The client device 110 can further include one or more input/output ports 1350, a power supply 1352, one or more sensors 1354 for example, an accelerometer, a gyroscope, a compass, or an infrared proximity sensor for detecting the orientation or motion of the client device 110, a transceiver 1356 (for wirelessly transmitting analog or digital signals) and/or a physical connector 1360, which can be a USB port, IEEE 1394 (FireWire) port, and/or RS-232 port. The illustrated components are not required or all-inclusive, as any of the components shown can be deleted and other components can be added.

Figure 14:
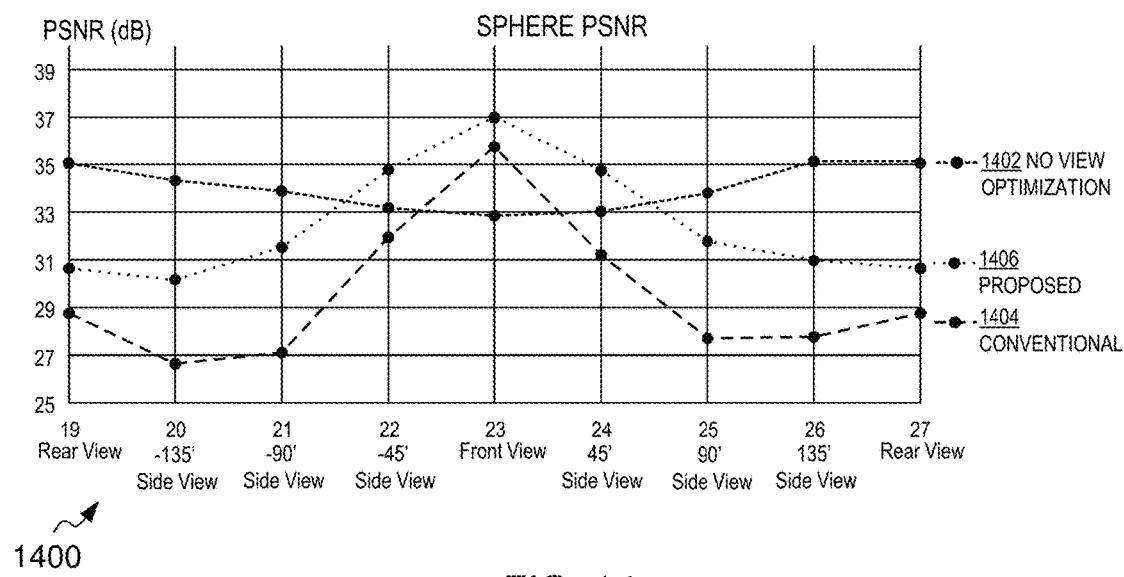
FIG. 14 illustrates a graph indicating improved performance of method and system described herein, in accordance with an example embodiment of the present disclosure.

FIG. 14 illustrates a graph 1400 indicating improved performance of method and system described herein, in accordance with an example embodiment of the present disclosure. The graph 1400 indicates peak signal to noise ratio on Y axis and views on X axis. The graph shows lines 1402, 1404 and 1406 for "no view optimization" encoding, "existing (or conventional) method" encoding, and "view optimization based (or proposed according to embodiments of present invention)" encoding as described herein.

Figure 15:
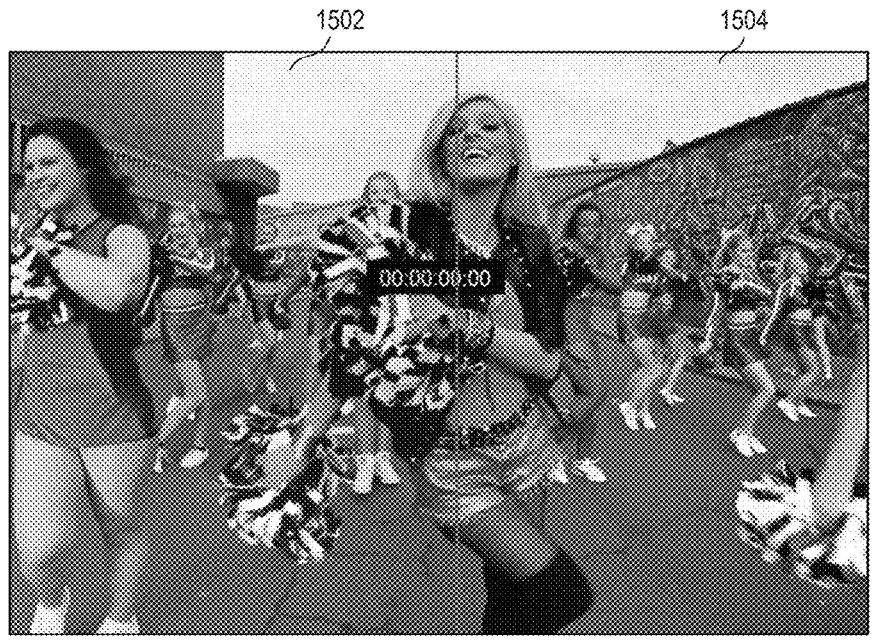
FIG. 15 illustrates a front view for display indicating improved performance of method and system described herein, in accordance with an example embodiment of the present disclosure.

FIG. 15 illustrates a front view for display indicating improved performance of method and system described herein, in accordance with an example embodiment of the present disclosure. A portion 1502 corresponds to view generated using existing solution and a portion 1504 corresponds to view generated using method described herein.

Figure 16:
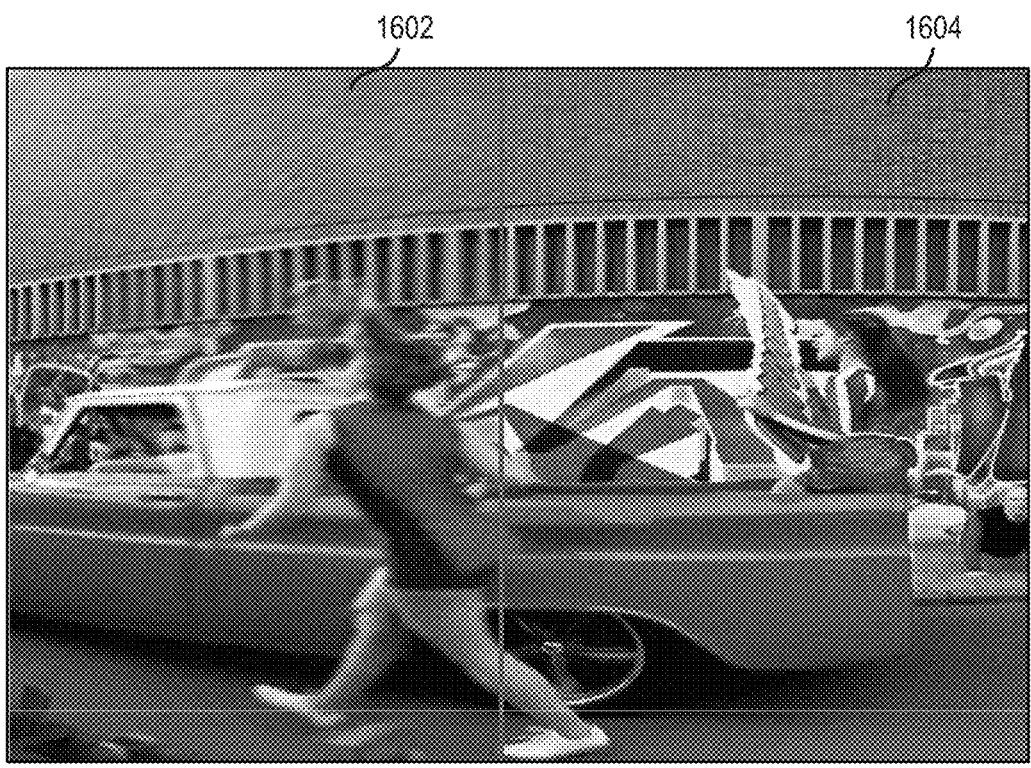
FIG. 16 illustrates a back view indicating improved performance of method and system described herein, in accordance with an example embodiment of the present disclosure.

FIG. 16 illustrates a back view indicating improved performance of method and system described herein, in accordance with an example embodiment of the present disclosure. A portion 1602 corresponds to view generated using existing solution and a portion 1604 corresponds to view generated using method described herein.

Various embodiments, as described herein, provide improved video quality. For each view optimized view point and for both objective and subjective measures, the front view is either equal or slightly better in FIG. 15 and FIG. 16. Side and back views are noticeably better in FIG. 15 and FIG. 16. The method described herein avoids need of any 3D mapping and need of sphere rotation for view change, and at the same time provides improved flexibility. Macroblock based foveated ROI definition allows maximum flexibility in approximating the fovea resolution change of the human eye. The strength of view optimization can be easily controlled through size and shape of foveated ROI, through strength of quantization offset, and through strength of DCT coefficient filtering.

Figure 17:
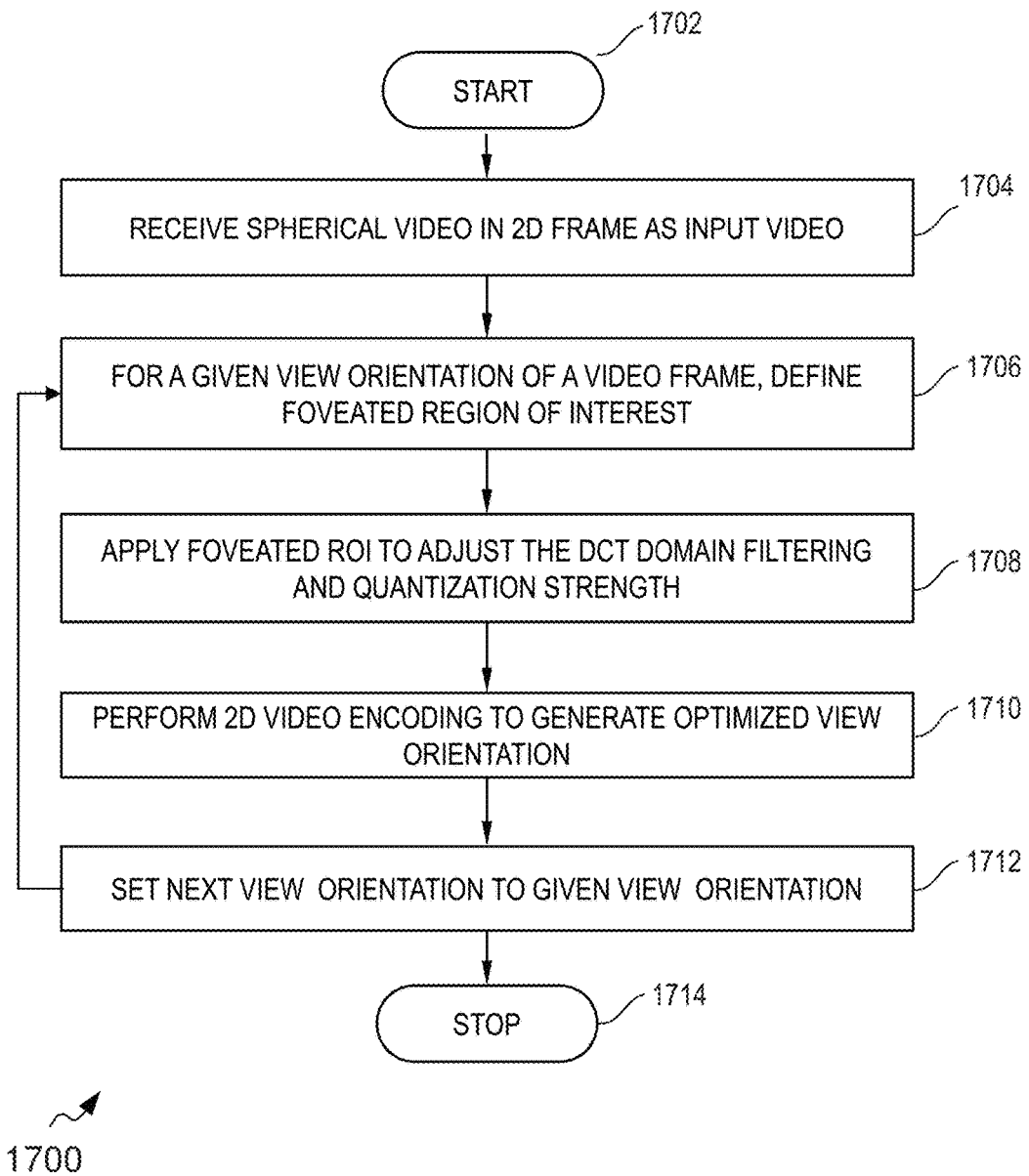
FIG. 17 illustrates a method for performing view optimization, in accordance with an example embodiment of the present disclosure.

FIG. 17 illustrates a method 1700 for performing view optimization, in accordance with an example embodiment of the present disclosure.

The method 1700 starts at step 1702. At step 1704, a 360 degree video mapped in 2D frame as input video is received. The video includes multiple frames. Each frame has plurality of macroblocks. Each 360 degree video frame has full spherical view coverage.

In some embodiments, the 360 degree video is mapped to 2D domain to generate the 2D frames of the video. The method can then be performed frame by frame, or view orientation by view orientation or simultaneously. Macroblocks are also generated for each frame.

At step 1706, for a given view orientation of a video frame, foveated region of interest is defined.

At step 1708, the foveated region of interest of the video frame is used to calculate the DCT domain filtering strength (also referred to as adjustment of filtering strength) and to adjust quantization offset value (also referred to as adjustment of quantization strength) for each macroblock in the video frame.

At step 1710, 2D video encoding of the macroblocks of given view orientation is performed to generate optimized view orientation. At step 1712, next view orientation is set to given view orientation and the processing continues at step 1706 until all view orientations are processed. Similarly, all desired video frames are processed and encoded before streaming In some embodiments, the algorithm for steps described above is as follows:
For a given spherical video mapped in 2D frame:
1: for a given view orientation,
Define the foveated region of interest of the video frame as followings:
The foveated ROI is defined on macroblock basis to better fit video encoding structure
The shape of the foveated ROI is defined to match human vision characteristics and the field of view of the viewing device
The foveated ROI only needs to be calculated once and is applied to all the frames in the video
Apply the ROI value to calculate the filtering strength and the quantization offset for each macroblock
2: conduct the normal 2D video encoding process, except for the following changes
2a: After a macroblock is transformed into DCT coefficients and before any quantization is applied
Apply view adaptive DCT domain filtering
2b: After DCT domain filtering and before the actual quantization is applied
Apply view adaptive quantization to adjust the quantization step
2c: After Step 2a and 2b
Apply the normal quantization to DCT coefficients using the view adjusted quantization step
3: for view optimization of another view orientation,
Set the current view to the new view and go to 1
The method 1700 stops at step 1716.

Figure 18:
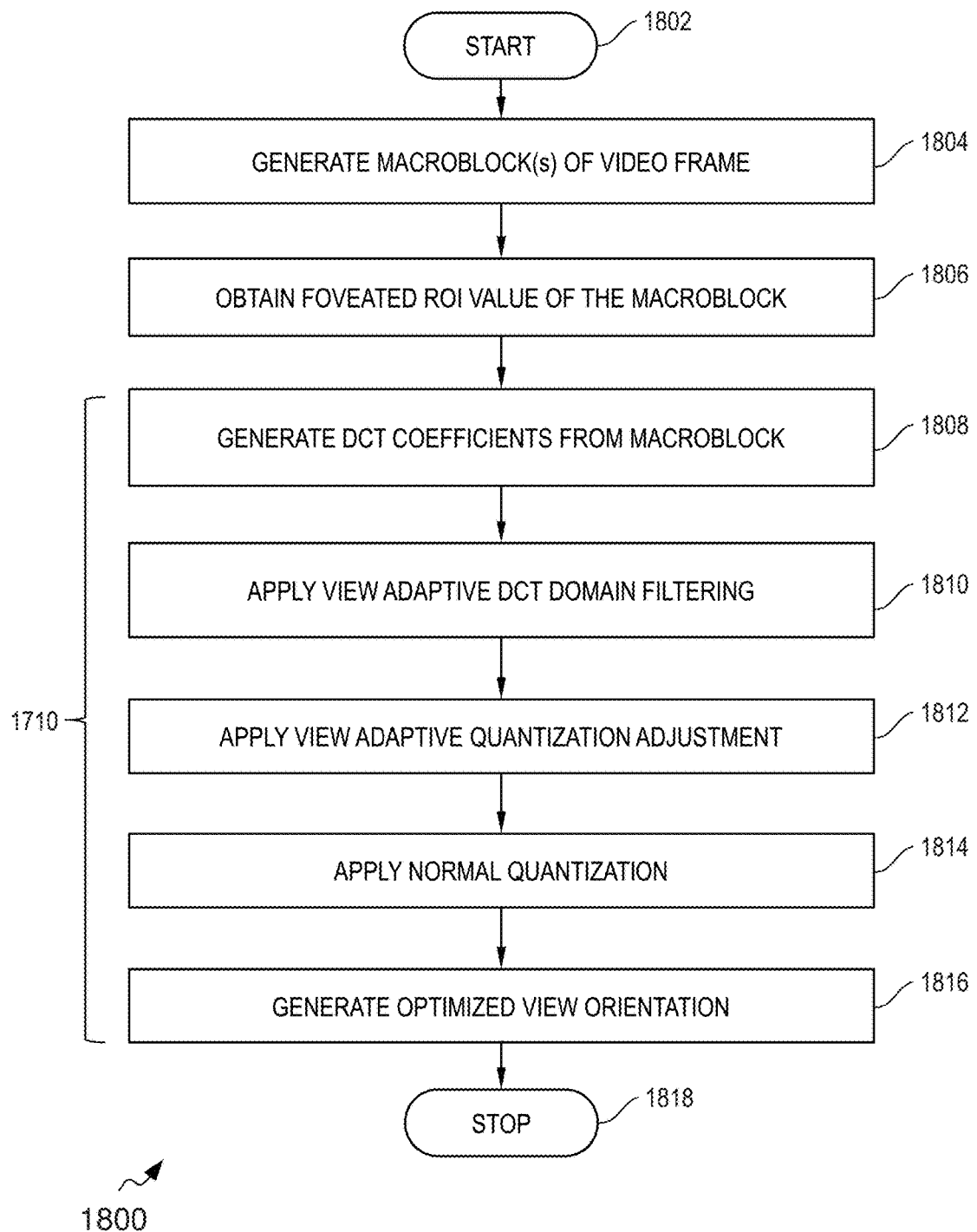
FIG. 18 illustrates a method for performing view optimization, in accordance with another example embodiment of the present disclosure.

FIG. 18 illustrates a method 1800 for performing view optimization, in accordance with another example embodiment of the present disclosure.

The method 1800 starts at step 1802 and indicates processing of a video frame.

At step 1804, macroblocks of a video frame are generated.

At step 1806, the foveated ROI value for the macroblock is obtained or defined.

At step 1808, DCT coefficients are generated for macroblocks.

At step 1810, view adaptive DCT domain filtering is performed on the DCT coefficients.

At step 1812, view adaptive quantization strength adjustment is performed for the DCT coefficients.

At step 1814, normal quantization of the DCT coefficients is performed.

At step 1816, optimized view orientation is generated. Various view orientations are processed similarly to generate optimized views for the video frame. In some embodiments, step 1814 and step 1816 can be a single step.

In some embodiments, steps 1808 to 1816 are part of step 1710. In one embodiment, step 1814 is part of step 1812 or step 1810.

The method 1800 stops at step 1818.

Figure 19:
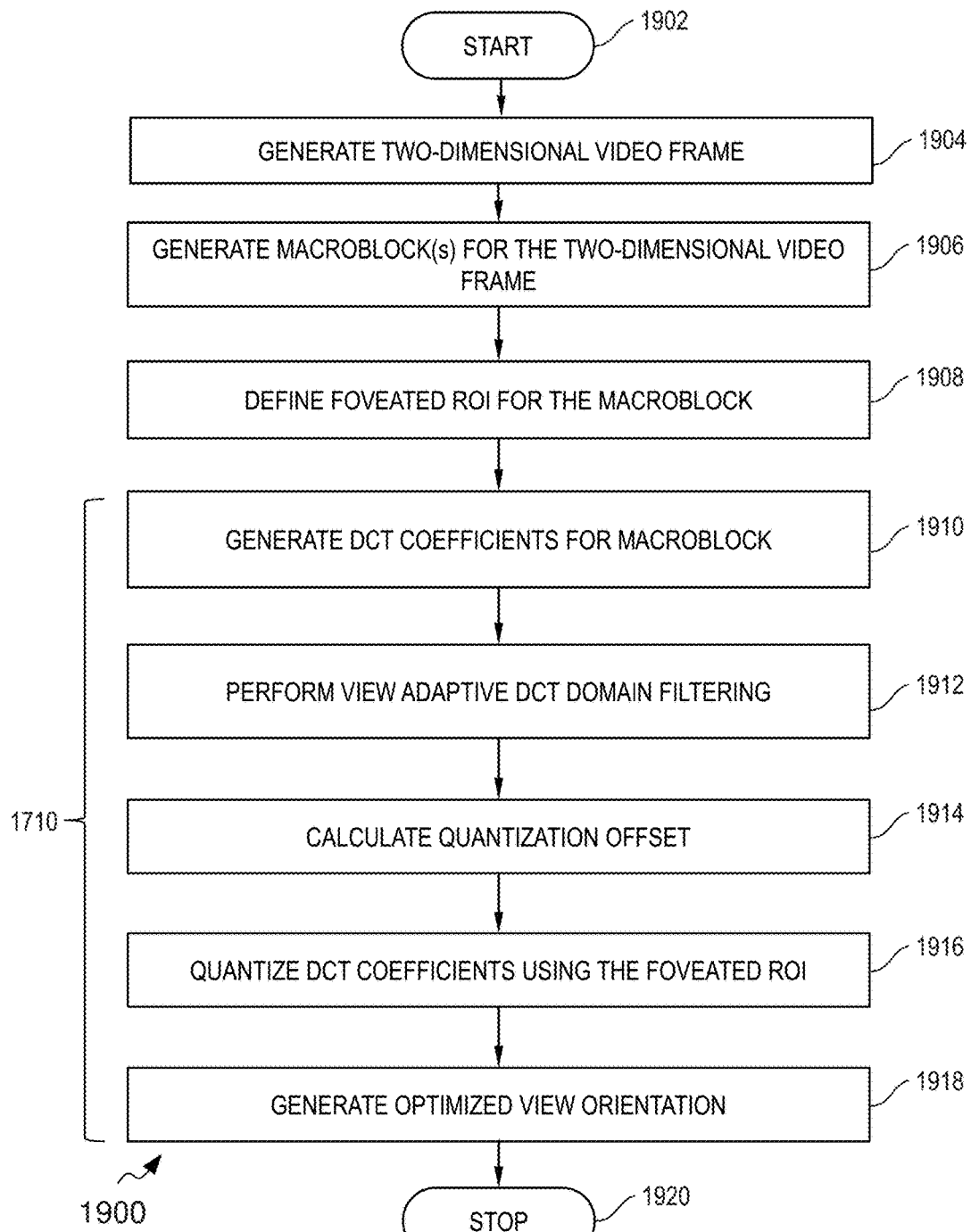
FIG. 19 illustrates a method for performing view optimization, in accordance with yet another example embodiment of the present disclosure.

FIG. 19 illustrates a method 1900 for performing view optimization, in accordance with another example embodiment of the present disclosure.

The method 1900 starts at step 1902 and indicates processing of a video frame.

At step 1904, two dimensional video frames are generated from a 360 degrees video.

At step 1906, macroblocks of the two-dimensional video frame are generated.

At step 1908, the foveated ROI is defined for the macroblock.

At step 1910, DCT coefficients are generated for macroblocks.

At step 1912, view adaptive DCT domain filtering is performed on the DCT coefficients.

At step 1914, quantization offset is calculated for the DCT coefficients.

At step 1916, quantization of the DCT coefficients is performed using the foveated ROI and quantization offset.

At step 1918, optimized view orientation is generated for the two-dimensional video frame. Various view orientations are processed similarly to generate optimized views for the video frame. In some embodiments, step 1916 and step 1918 can be a single step.

In some embodiments, steps 1908 to 1916 are part of step 1710. In one embodiment, step 1914 is part of step 1912 or step 1910.

The method 1900 stops at step 1920.

Figure 20:
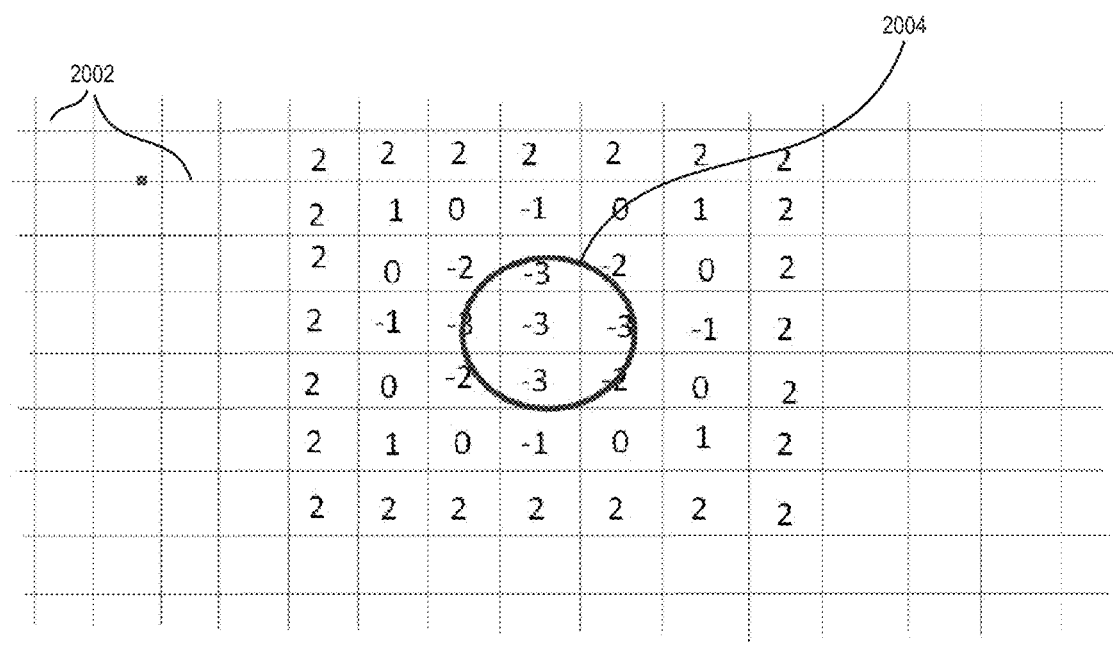
FIG. 20 illustrates region of interest based quantization, in accordance with an example embodiment of the present disclosure.

FIG. 20 illustrates region of interest based quantization, in accordance with an example embodiment of the present disclosure. The macroblocks 2002 of the video frame and a foveated region of interest 2004 are shown to indicate that the quantization based on the foveated region of interest. The quantization offset setting is performed based on the foveated region of interest 2004. The macroblock outside the foveated region of interest 2004 is assigned positive quantization offset and to the macro block inside the foveated region of interest 2004 is assigned negative quantization offset. Zero quantization offset is assigned on the boundary of the foveated region of interest 2004.

Figure 21:
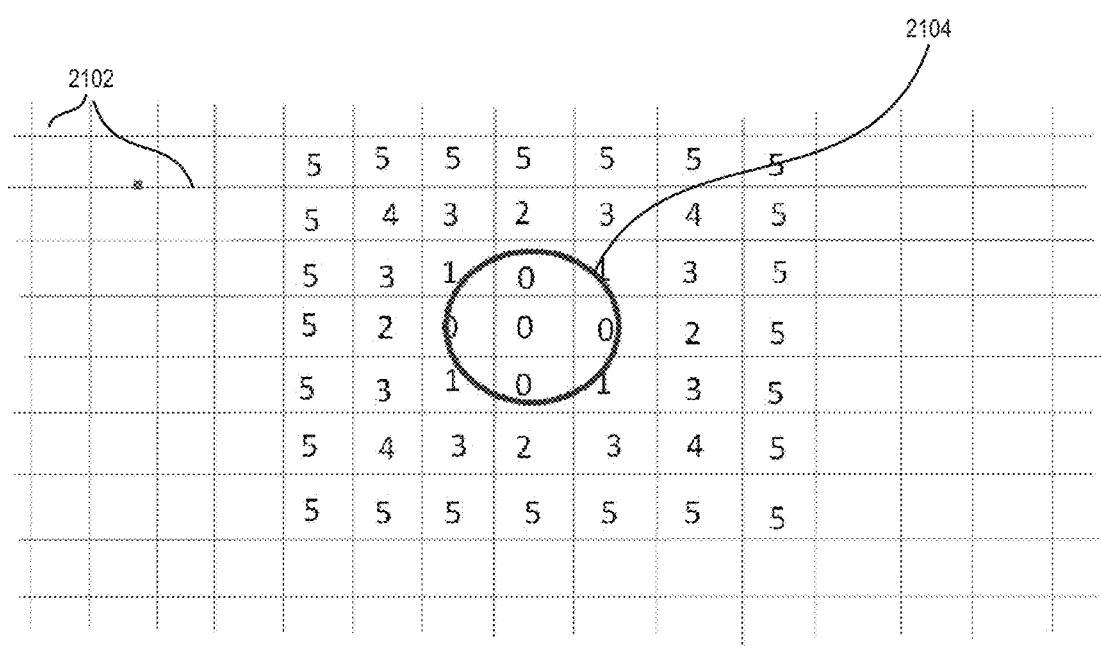
FIG. 21 illustrates DCT coefficient based filtering, in accordance with an example embodiment of the present disclosure.

FIG. 21 illustrates DCT coefficient based filtering, in accordance with an example embodiment of the present disclosure. The macroblocks 2102 of the video frame and a foveated region of interest 2104 are shown to indicate macroblock based filtering threshold set up. The macroblocks 2102 present outside the foveated region of interest 2104 are assigned higher filtering threshold and the macroblocks 2102 present inside the foveated region of interest 2104 are assigned low filtering threshold. The macroblock 2104 on boundary of the foveated region of interest 2104 are assigned a value of zero.

Figure 22:
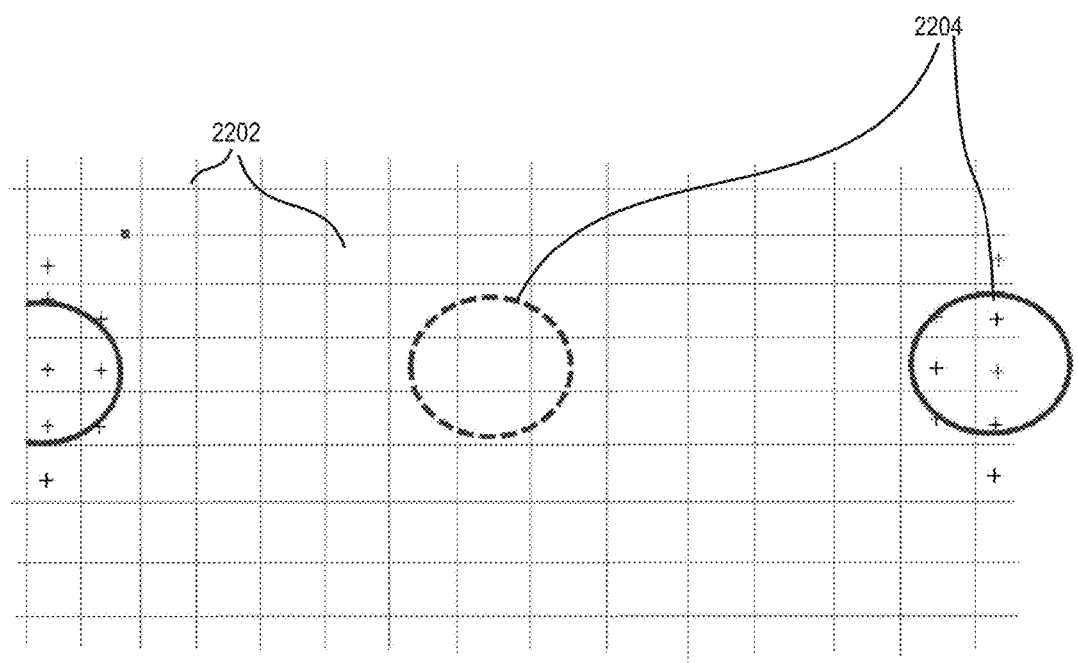
FIG. 22 illustrates rotation of region of interest, in accordance with an example embodiment of the present disclosure.

FIG. 22 illustrates rotation of region of interest, in accordance with an example embodiment of the present disclosure. The macroblocks 2202 of the video frame and foveated regions of interest 2204 are shown. FIG. 22 shows foveated regions of interest 2204 setting for rear view. The foveated region of interest 2204 changes based on view orientation change in 2D frame.

In general, the method executed to implement the embodiments of the present disclosure, may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects of the invention. Moreover, while the present disclosure has been described in the context of fully functioning computers and computer systems, those skilled in the art will appreciate that the various embodiments of the invention are capable of being distributed as a program product in a variety of forms, and that the present disclosure applies equally regardless of the particular type of machine or computer readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

The present disclosure is described above with reference to block diagrams and flowchart illustrations of method and device embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method for view optimization of a 360 degrees video, the method comprising:
    receiving, by a server, a video frame of the 360 degrees video as an input video;
    defining, by the server, a foveated region of interest for a given view orientation of the video frame based on a view centre in the given view orientation;
    applying the foveated region of interest to the video frame; and
    encoding the video frame on which the foveated region of interest is applied to generate an optimized view orientation for the video frame.

2. The method as claimed in claim 1 and further comprising:
    setting next view orientation as the given view orientation by rotating the foveated region of interest based on change in the view centre in each view orientation of the video frame; and performing steps of defining, applying, encoding, and setting until all view orientations are optimized.

3. The method as claimed in claim 1 and further comprising:
    performing steps of defining, applying, and encoding for all video frames of the 360 degrees video to generate a view optimized video.

4. The method as claimed in claim 1, wherein the video frame is a two-dimensional video frame of the 360 degrees video.

5. The method as claimed in claim 1 and further comprising:
    generating macroblocks for the video frame.

6. The method as claimed in claim 1, wherein defining comprises defining the foveated region of interest based on human vision characteristics and field of view.

7. The method as claimed in claim 6, wherein applying comprises applying the foveated region of interest to the video frame to adjust Discrete Cosine Transform (DCT) domain filtering and quantization strength for each macroblock.

8. The method as claimed in claim 7, wherein encoding comprises:
    generating DCT coefficients from the macroblocks;
    applying view adaptive DCT domain filtering on the macroblocks;
    applying view adaptive quantization adjustment on the macroblocks;
    applying normal quantization to the macroblocks; and generating the optimized view orientation based on the DCT coefficients, the view adaptive DCT domain filtering, the view adaptive quantization adjustment, and the normal quantization.

9. A system for view optimization of a video, the system comprising:
- a region of interest generator for generating a foveated region of interest for the video; and
- an encoder for encoding the video and generating optimized video using the foveated region of interest, the encoder comprising
  - a DCT (Discrete Cosine Transform) coefficient generator for generating DCT coefficients for a video frame of the video,
  - a view adaptive DCT domain filter for performing view adaptive DCT domain filtering on the video frame based on the foveated region of interest,
  - a view adaptive quantization offset calculator for calculating the view adaptive quantization offset based on the foveated region of interest, and
  - a normal quantizer for quantizing the video frame using the view adaptive quantization offset to generate the optimized video.

10. The system as claimed in claim 9 and further comprising a macroblocks generator for generating macroblocks for the video frame.

11. The system as claimed in claim 10, wherein the encoder processes the video frame by processing the macroblocks of the video frame.

12. The system as claimed in claim 9, wherein the video is a 360 degrees video.

13. The system as claimed in claim 9, wherein the video frame is a two-dimensional video frame of the 360 degrees video.

14. A system comprising:
- a processor; and
- a memory coupled to the processor, the memory storing instructions which when executed by the processor cause the system to perform a method for view optimization of a 360 degrees video, the method comprising
  - generating a two-dimensional video frame from the 360 degrees video,
  - generating macroblocks for the two-dimensional video frame,
  - defining a foveated region of interest for the two-dimensional video frame based on a given view orientation,
  - generating Discrete Cosine Transform (DCT) coefficients for the macroblocks,
  - performing view adaptive DCT domain filtering on the DCT coefficients using the foveated region of interest,
  - calculating quantization offset for the DCT coefficients using the foveated region of interest,
  - quantizing the DCT coefficients using the quantization offset to generate encoded two-dimensional video frame for the view orientation, and
  - set new view orientation as the given view orientation and perform steps of generating, performing, calculating, and quantizing for each view orientation.

15. The system as claimed in claim 14 and further comprising:
- performing steps of generating, performing, calculating, and quantizing for each view orientation for each two-dimensional video frame to enable generation of view optimized video.

16. The system as claimed in claim 14, wherein calculating comprises:
- assigning a negative quantization offset if the macroblock is inside the foveated region of interest;
- assigning a positive quantization offset if the macroblock is outside the foveated region of interest; and
- assigning a zero value if the macroblock is on the foveated region of interest.

17. The system as claimed in claim 16, wherein performing comprises:
- assigning a lower filtering threshold if the macroblock is inside the foveated region of interest to achieve low information reduction;
- assigning a higher filtering threshold if the macroblock is outside the foveated region of interest to achieve high information reduction; and
- assigning a zero filtering threshold if the macroblock is on the foveated region of interest.

18. The system as claimed in claim 17, wherein quantizing comprises:
- quantizing the macroblock using the quantization offset and based on the filtering threshold.

19. The system as claimed in claim 14 and further comprising:
- providing encoded video for decoding and playing.

* * * * *